US012807057B2

(12) United States Patent
Katz et al.

(10) Patent No.: US 12,807,057 B2
(45) Date of Patent: Nov. 24, 2026

(54) REMOTE TANK MONITORING DEVICE SYSTEM AND METHOD

(71) Applicant: KATZ WATER TECH, LLC, Houston, TX (US)

(72) Inventors: Gary P. Katz, Houston, TX (US); Christopher P. Mayo, Houston, TX (US)

(73) Assignee: Kate Water Tech, LLC, Houston, TX (US)

( * ) Notice: Subject to any disclaimer, the term of this patent is extended or adjusted under 35 U.S.C. 154(b) by 342 days.

(21) Appl. No.: 18/236,396

(22) Filed: Aug. 21, 2023

(65) Prior Publication Data

US 2024/0059207 A1 Feb. 22, 2024

Related U.S. Application Data

(60) Provisional application No. 63/533,881, filed on Aug. 21, 2023, provisional application No. 63/407,898, filed on Sep. 19, 2022, provisional application No. 63/399,549, filed on Aug. 19, 2022.

(51) Int. Cl.
*B60P 3/22* (2006.01)
*G01F 23/18* (2006.01)

(52) U.S. Cl.
CPC ............. *B60P 3/228* (2013.01); *B60P 3/2205* (2013.01); *G01F 23/185* (2013.01)

(58) Field of Classification Search
CPC ....... B60P 3/228; B60P 3/2205; G01F 15/063
USPC ......................... 324/425, 663–678, 693–701
See application file for complete search history.

(56) References Cited

U.S. PATENT DOCUMENTS

2014/0087685 A1* 3/2014 Kellond .................. G06F 3/041 345/173
2019/0148196 A1* 5/2019 Lin ........................ G01N 25/68 73/29.01
2022/0141554 A1* 5/2022 Rodriguez, Jr. ......... H04Q 9/00 340/870.07

FOREIGN PATENT DOCUMENTS

CN 102448538 A * 5/2012 ............. A61B 5/486
CN 111867672 A * 10/2020 ............. G10L 25/66
WO WO-2018176097 A1 * 10/2018 ............. A47G 23/10

* cited by examiner

*Primary Examiner* — Robert R Raevis
(74) *Attorney, Agent, or Firm* — Gary P. Katz; Katz Law Group, LLC

(57) ABSTRACT

A tank monitor control system, device and methods are disclosed that are suitable for remote monitoring. The device comprises a monitoring unit for insertion into a fluid holding device or tank to monitor a level of fluid stored in the fluid holding device. The monitoring unit comprises at least one sensor and a communication device for transmitting the data. Additional functionalities include location data, temperature data, water quality properties, and a pressure device for measuring pressure and calculating the weight of the fluid. The system provides automatic data generation and user defined alerts along with the ability to use artificial intelligence.

20 Claims, 9 Drawing Sheets

Device Mounted to Pipe Wall

Device Connected to Sampleline

REMOTE TANK MONITORING DEVICE SYSTEM AND METHOD

CROSS-REFERENCE TO RELATED APPLICATIONS

The present application is a new United States Nonprovisional patent application that claims priority to U.S. Provisional Application No. 63/399,549 entitled REMOTE TANK MONITORING DEVICE SYSTEM AND METHOD with confirmation number 7831 filed on Aug. 19, 2022, U.S. Provisional Application No. 63/407,898 entitled REMOTE FLUID MONITORING DEVICE SYSTEM AND METHOD with confirmation number 3071 filed on Sep. 19, 2022, and U.S. Provisional Application No. 63/533,881 entitled REMOTE FLUID MONITORING DEVICE SYSTEM AND METHOD with confirmation number 6174 filed on Aug. 21, 2023. U.S. Provisional applications Nos. 63/399,549, 63/407,898, and 63/533,881 are hereby incorporated by reference in their entity.

FIELD

The invention relates to monitoring the operational performance of fluid storage and transportation systems. More particularly, the embodiments relate to devices, systems, and methods for determining fluid volumes and other properties. Most specifically, the invention relates to devices, systems, and methods to remotely monitor multiple properties in a fluid holding tank, pipeline, or vehicle.

BACKGROUND OF THE INVENTION

Currently, most liquid volumes within a vessel are measured by either visual measurements, dip sticks or simple floats, mounted within the vessel, that move, for example, a wiper on a variable resistor. Such measurement methods have associated problems. For example, utilizing the float to measure an amount of liquid does not work well for irregularly shaped fuel tanks. Additionally, floats are prone to mechanical wear and become inoperable after a time. Float devices may also be affected by corrosive chemicals.

While there are some systems that can accurately and consistently measure water volume level and weight, these systems are usually extremely expensive to build and operate and are typically connected to a larger SCADA control system. The expense and complexity make these types of system too expensive for most remote sites or vehicles transporting fluids. In addition, the programmable logic controllers (PLC) systems are extremely expensive and are easily broken when placed into vehicles or into the field.

Currently there are no inexpensive systems that can remotely monitor fluid in a tank or other devices and transmit the data. Accordingly, there is a need for a low-cost device that can measure and transmit fluid level data as well as other useful data and a system that can allow an onsite or remote user to easily access, view, and search the data. In addition, there is a need for a device and system that can inexpensively work with other systems to give the operators the ability to coordinate water related activities in a coordinated manner. Embodiments of this invention, which are discussed herein, satisfy these needs.

SUMMARY OF THE INVENTION

Embodiments of the invention relate to a device for monitoring fluids. In one embodiment this device comprises an outer protective housing; a wireless communication device inside the outer protective housing; at least one device for determining at least one property of a fluid that is connected to the outer protective housing; and at least one transmitter for sending data from the at least one device for determining the at least one property of a fluid to the wireless communication device.

A method embodiment is disclosed. In one embodiment, the method comprises 5 steps. First, a fluid monitoring device is obtained. Second, the fluid monitoring device is installed inside container for holding fluids. Third, data is transmitted from the fluid monitoring device to a data receiving device. Fourth the data is stored for retrieval. Fifth, the data is displayed.

A tank monitoring system is disclosed. In one embodiment the tank monitoring system comprises: an outer protective housing; a wireless communication device inside the outer protective housing; at least one device for determining at least one property of a fluid that is connected to the outer protective housing; at least one transmitter for sending data from the at least one device for determining the at least one property of a fluid to the wireless communication device; and a control system for receiving the data and calculating at least one output from the sensors. The water monitoring device includes a sensor module, equipped with various sensors to measure critical parameters like pH, turbidity, contaminants, fluid volumes, levels, weights, and other properties. These sensors offer real-time insights, allowing operators to make timely decisions and maintain optimal water quality and distribution. The blockchain network ensures the secure and transparent recording of this data, creating a reliable and accessible record for all stakeholders.

BRIEF DESCRIPTION OF THE DRAWINGS

The foregoing is intended to give a general idea of the invention and is not intended to fully define nor limit the invention. The invention will be more fully understood and better appreciated by reference to the following description and drawings.

DETAILED DESCRIPTION

Figure 1:
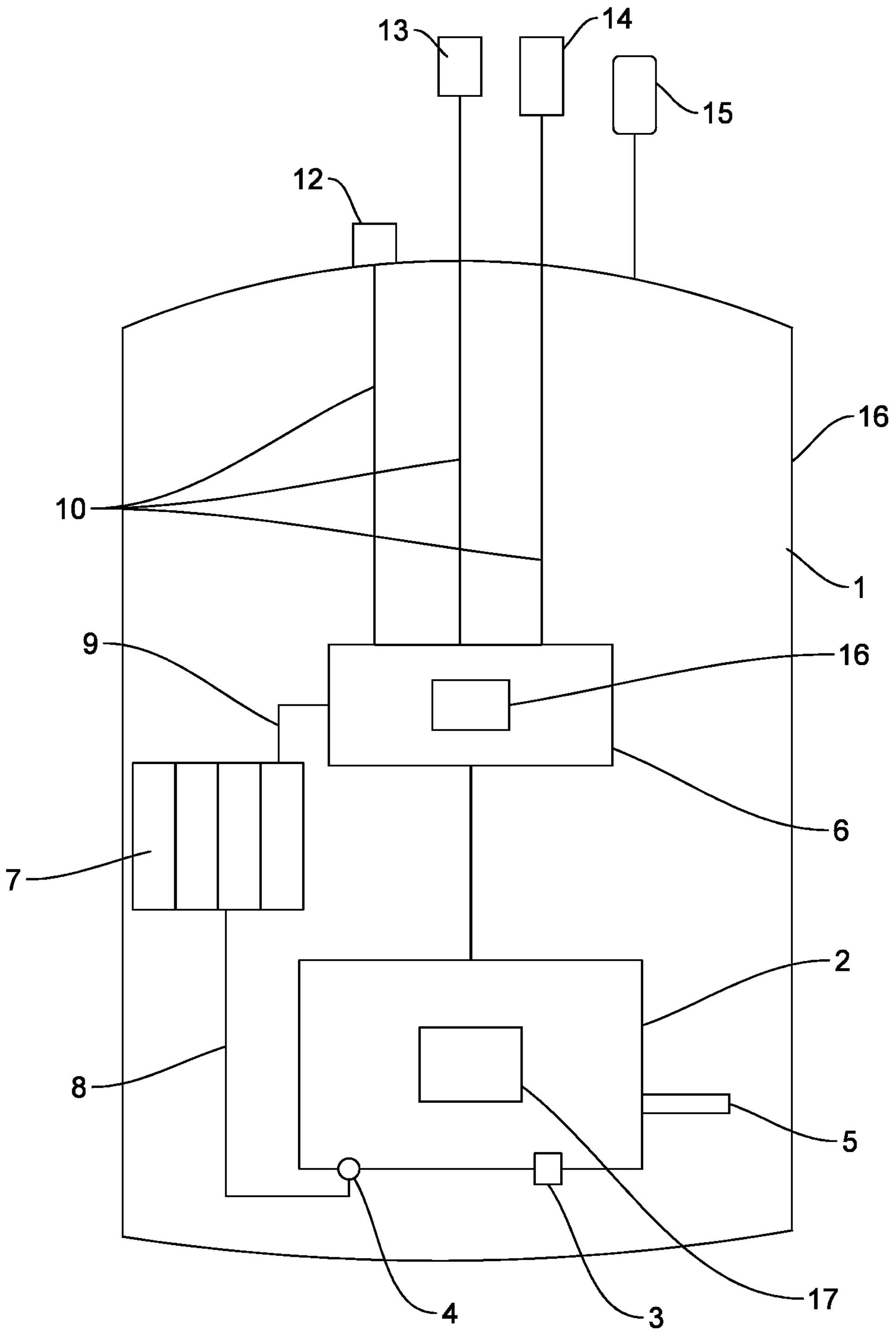
FIG. 1 is a schematic of a fluid monitoring device.

Before describing selected embodiments of the present disclosure in detail, it is to be understood that the present invention is not limited to the embodiments described herein. The disclosure and description herein are illustrative and explanatory of one or more presently preferred embodiments and variations thereof, and it will be appreciated by those skilled in the art that various changes in the design, organization, means of operation, structures and location, methodology, and use of mechanical equivalents may be made without departing from the spirit of the invention.

As well, the drawings are intended to illustrate and disclose presently preferred embodiments to one of skill in the art but are not intended to be manufacturing-level drawings or renditions of final products and may include simplified conceptual views to facilitate understanding or explanation. Also, the relative size and arrangement of the components may differ from that shown and still operate within the spirit of the invention.

Moreover, it will be understood that various directions such as “upper”, “lower”, “bottom”, “top”, “left”, “right”, “first”, “second”, and so forth are made only concerning explanation in conjunction with the drawings, and that components may be oriented differently, for instance, during transportation and manufacturing as well as operation. Because many varying and different embodiments may be made within the scope of the concept(s) herein taught, and because many modifications may be made in the embodiments described herein, it is to be understood that the details herein are to be interpreted as illustrative and non-limiting.

At industrial sites, there is a need to monitor the water or fluid level of the tanks, especially at oil and gas well sites. At oil and gas well sites an operator sometimes called a pumper usually determines the water level, oil level, or produce water level through a visual inspection or dip stick. Very often the pumper needs to use a ladder or climb up on a catwalk to determine water levels. This activity is time-consuming and potentially dangerous and requires a pumper to be onsite. Other options typically involve the complicated and expensive SCADA system.

In one embodiment, the present invention pertains to a fluid monitoring apparatus, method, and system designed to ascertain various properties of a fluid and facilitate seamless data transmission, storage, and retrieval. In an embodiment, the core of the apparatus consists of an outer protective housing, serving as a shield against environmental elements such as, rain, hail, and snow, and potential physical damage. Encased within this housing is a wireless communication device, which may be realized as a cellular router.

Linked to the outer protective housing is at least one device for determining at least one property of a fluid. This device may include various sensors like fluid level monitors, pressure sensors, etc. These sensors are connected to at least one transmitter within the housing through a cable or other suitable means, capable of converting analog signals into digital form.

The transmitter’s purpose is to send data from the sensors to the wireless communication device. Additional features may include a receiving device for obtaining information sent via the wireless communication device, a graphical display for visually representing the data, and a storage device for preserving the information for later use.

Specific configurations might encompass additional elements such as a sensor for measuring water levels, a device for determining location, and at least two sensors for different functionalities, such as monitoring fluid levels and determining pressure. Some embodiments also include alert functionalities set by the user, with a variety of alert values.

One embodiment is a method of operation. This method embodiment comprises a method involving obtaining the fluid monitoring device, installing it inside a tank or container holding fluids, and transmitting data from the fluid monitoring device to a device designed for receiving the data. The data is then stored for future retrieval, graphical display, and communication with the user. The method further allows for the determination of additional properties from the collected data, such as speed, number of breaks, duration of breaks, weight of fluid, density, salt concentration in fluid, etc. Users can set alert values to receive notifications when specific criteria are met. This method offers diverse applications, from monitoring fluid levels in a tank to tracking truck movements or unexpected volume changes.

Another embodiment is a system composition. In this embodiment, the system can bring together various components into a cohesive framework, comprising the protective housing, wireless communication device, fluid property-determining devices, transmitter, and a control system. The control system can stand as the central hub for receiving data and calculating outputs from the sensors. It may include functionalities for graphically displaying the data and using the information to deduce additional properties. The control system also allows for the establishment of alert values, sending alerts as per the defined criteria. Depending on the implementation, the control system can be connected to multiple tank fluid monitoring devices, offering a broader scope and higher efficiency in monitoring and managing fluid properties across different sites.

The embodiments described herein can provide a robust and versatile solution for fluid monitoring, covering various configurations of apparatus, methods, and systems. The novel design can integrate essential features like protective housing, wireless communication, diverse sensors, data transmission, and interactive user controls. With applications ranging from industrial tanks to transportation, this technology marks a significant advancement in fluid monitoring and management. The incorporation of AI, ML, and DAO components provides additional functionalities.

In one embodiment, a simple fluid monitoring device can be inserted into a water container or fluid storage device. FIG. 1 is an illustration of a fluid monitoring device 1. The fluid level monitoring device 1 is typically comprised of an outer housing 16. Preferably, the outer housing should be sealable from the environment including splash proof or waterproof. Inside housing 16 is a communication device 2 which can include routers or modems.

Communication device 2 typically has a microprocessor 17 that sends a signal through at least one antenna 5. The signal can be Bluetooth, Wi-Fi, cellular or other electronic signals known to persons skilled in the art. Alternatively, the communication device 2 can be wired (not shown) and attached to a computer or SCADA system, or another network device. If the communication device 2 communicates via cellular towers, which is typically called cellular router, the communication device 2 typically has a sim card to assign it a unique identity. Alternatively, it can use other identifiers such as Internet Protocol (IP) numbers.

The communication device 2 typically has a power source connector 4 with a wire line 8 to a battery source 7 or an external power source (not shown). In this example the power source 7 runs, which can be one or more batteries in a power pack (not shown), both to the cellular communicator 2 through line 8 and the data transmitter 6 through line 9. Alternatively, each powered component may have separate power or the battery source 7 may run two or more components or all the components of the fluid monitoring device.

The battery source 7 can be replaced with a hard-wired power line to an external power source. The communication device can determine the location using cellular towers or satellites using microprocessor 17 or other known devices including location tracking device.

The transmitter 6 typically has a microprocessor 16 that obtains or receives the data from one or more sensors connected to the fluid monitoring device 1 and sends information or data as a digital code to the communication device 2. Sensors can send data using multiple signal types, including pulse signals, 4-20 mA, MODBUS, IP, and combinations thereof. In certain sensors, the data is sent in either an analog or digital signal that can be sent directly to the communication device such as IP sensors. Simple data can be sent as an analog value, whereas multiple data sets will typically require digital transmission.

The data transmitter 6 can be connected directly to the sensors or via wires 10. FIG. 1 illustrates four sensors including a level sensor 12, a pressure sensor 13, a temperature sensor 14 and electrical conductivity sensor 15. In some embodiments the sensor can contain the transmitter or can be connected to the transmitter via wires 10. It is possible to eliminate wires using wireless transmission. Examples of wireless transmission include but are not limited to cellular, Wi-Fi or Bluetooth. The expense and potential data connectivity issues with wireless transmission makes wire connection the preferred option.

The data transmitter 6 sends the data to the communication device 2 that sends the data to a receiver device (not shown). Most sensors send data via 4-20 mA and the transmitter needs to convert the analog 4-20 mA signal to a digital signal for the communication device to send the data typically through cellular communication.

Figure 9:
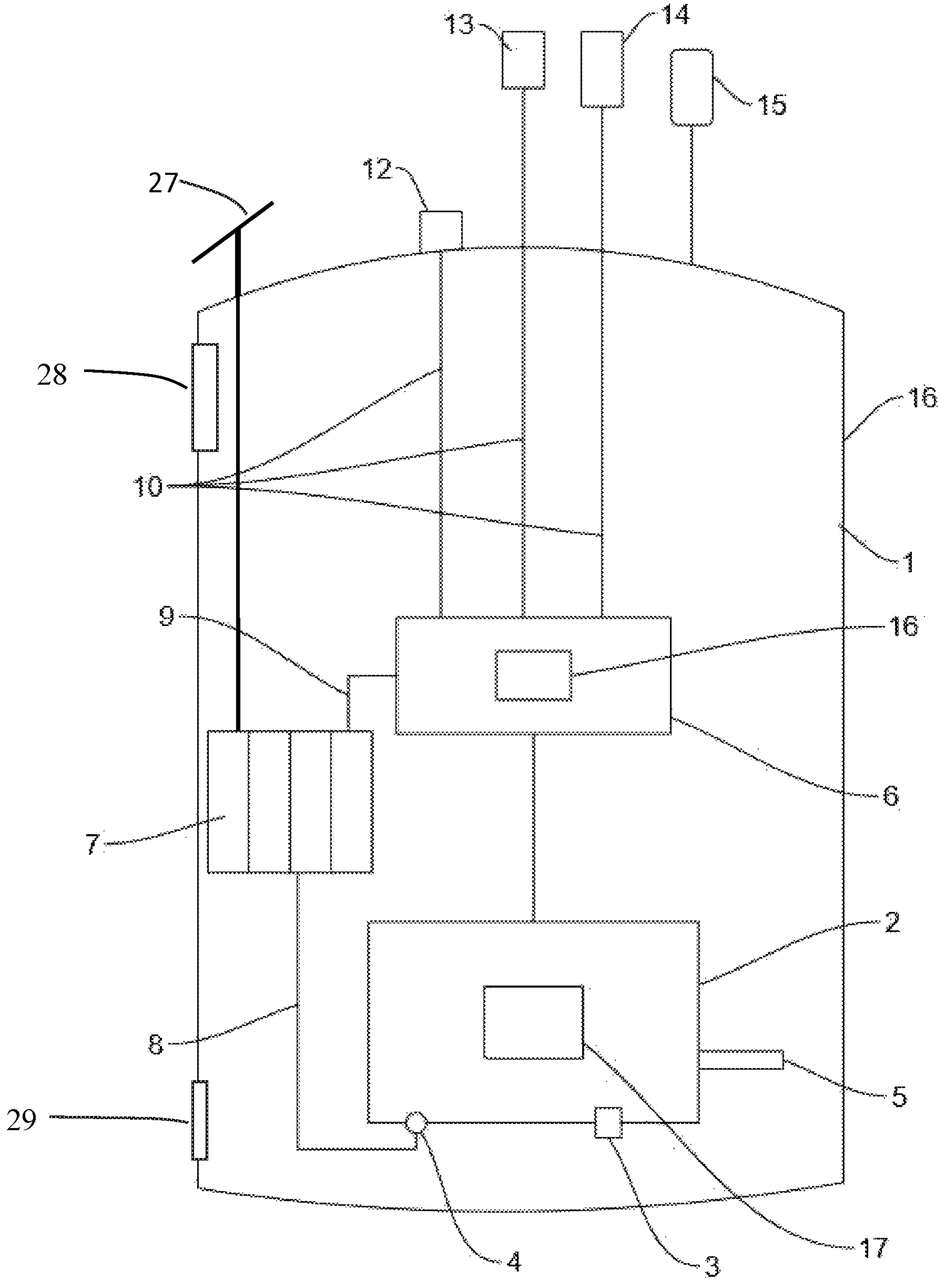
FIG. 9 is a schematic of a fluid monitoring device powered by solar photovoltaic energy.

FIG. 9 is a schematic of a fluid monitoring device powered by solar photovoltaic (PV) energy. The similar elements in FIG. 1 have been given the same reference numerals in FIG. 9. As shown in FIG. 9, a solar photovoltaic panel 27 is attached to the battery storage 7. If needed an inverter (not shown) can convert the voltage from the solar PV panel 27 to the voltage of the battery storage 7. To assist in cooling, a vent 28 and a fan 29 can be added to the storage box. Preferably, the vent 28 and fan 29 should be weatherproof to allow airflow but not moisture rain, or snow.

Figure 2:
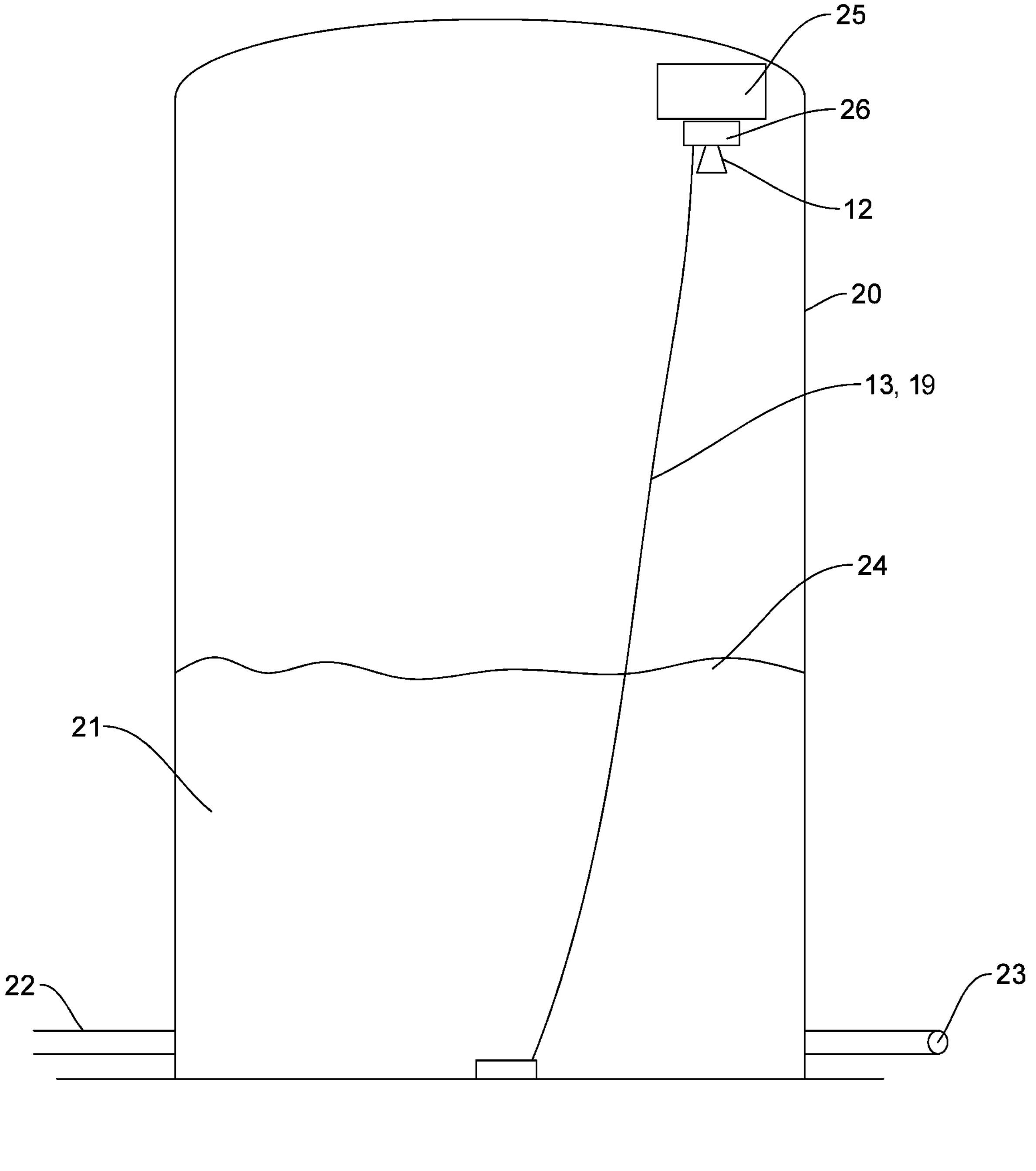
FIG. 2 illustrates an embodiment on how the fluid monitoring device can be used inside a stationary water tank.

FIG. 2. illustrates the fluid monitoring device now labeled 26 installed inside a fluid tank 20 in a remote location. The fluid tank 20 typically has door 25 for visual inspections which can be used to mount the fluid monitoring device 26. The tank will typically have an inlet for sending water 22 and outlet 23 for removing water. The fluid monitoring device 26 measures the level 24 of the fluid or water using one or more level sensors 12. Additionally, a pressure sensor 13 line can be extended to the bottom of the tank to measure pressure which can be correlated to weight and thus, tank level. Using the known volume or level of water 24 and the weight, TDS can be roughly calculated or approximated using density curves or other mathematical means. The data can then be sent directly to a user or to a server. In one embodiment a tank-level monitor 26 can have sensors in multiple tanks.

The fluid monitoring device 26 installed inside a fluid tank 20 in a remote location can be mounted using a mounted bracket (not shown). The mounting bracket can be attached with screws or bolts or adhesive to the top of the fluid tank 20 or other water-holding device. The outer housing can then be attached to the mounting bracket using screws, snaps, bolts, or other known clamping or attaching devices. If the fluid monitoring device 26 installed inside a fluid tank 20 is not mounted on the top, an offset may need to be calibrated into the system.

The fluid monitoring device 26 installed inside a fluid tank 20 is alternatively mounted on the top. FIG. 2. has an embodiment of a fluid monitoring device 26 mounted on the top of the tank utilizing one of two 4-inch inlets which are typically provided on most tanks. One cable passes through the 4-inch inlet 11 on which hangs the PH sensor 13, a temperature sensor 14, and electrical conductivity sensor 15. A second cable passes through the same inlet 11 on which hangs level/pressure sensor 12. With monitoring device 26 on the top of the tank a solar panel 27 is mounted to the monitoring device 26 enclosure to provide electric power.

Figure 3:
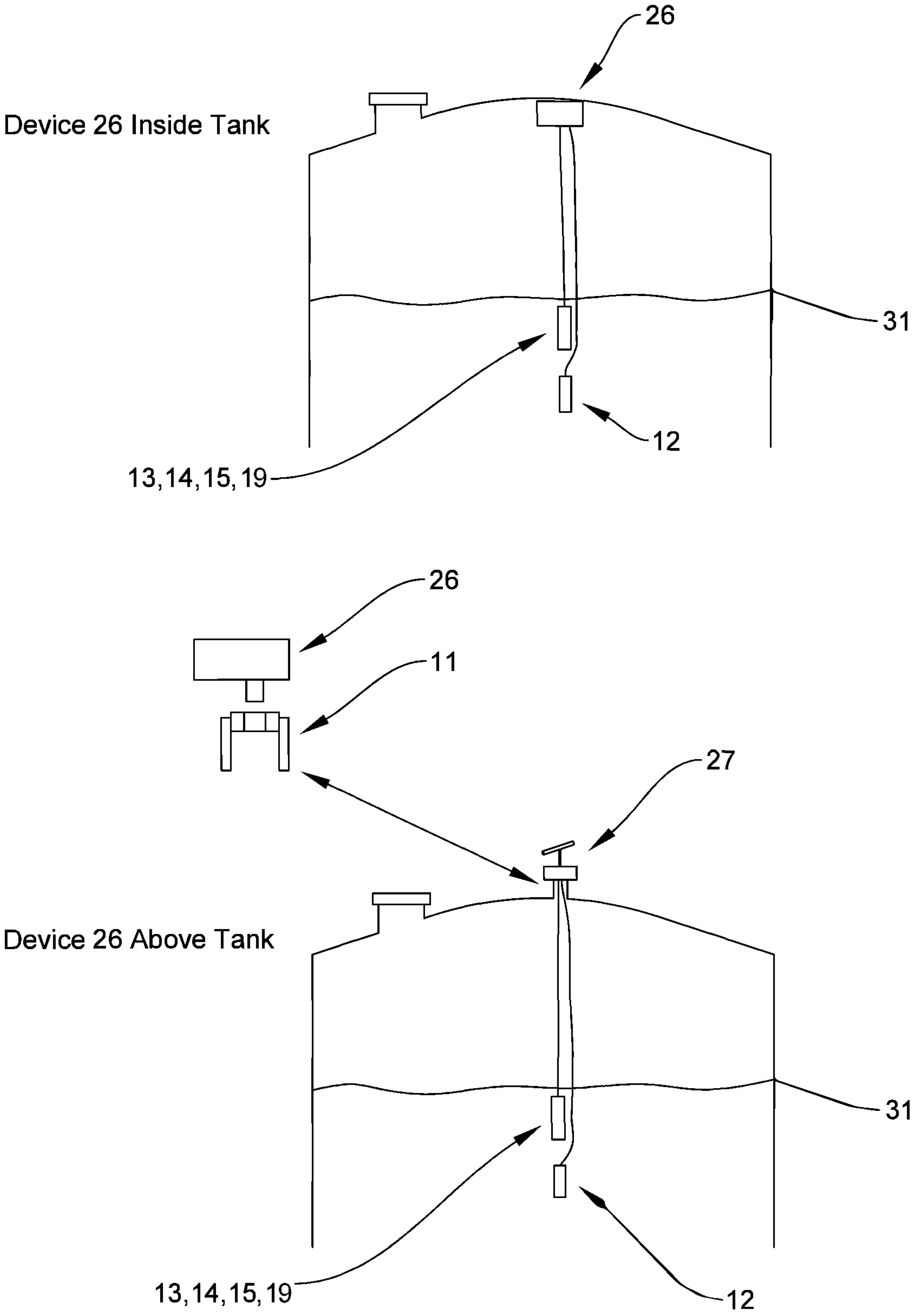
FIG. 3 illustrates an embodiment on how the fluid monitoring device can be used inside a water carrier truck.

FIG. 3. Illustrates a fluid monitoring device 1 installed inside a water truck 30, fluid truck, fuel truck or vehicles used to transport water. The fluid monitoring device is typically mounted inside the water container portion of the fluid truck 30 to measure the properties of the fluid. As shown in FIG. 3, the fluid monitoring device 1 has a water level sensor 12 and a pressure line sensor 13. The water level sensor is above the fluid 31 and the pressure line sensor is installed on the bottom of fluid container 32. Additional sensors include temperature 14 and electrical conductivity 15. As discussed above, the measured pressure can be correlated to weight or tank level. Using the known volume or level of water 24 and the weight, TDS can be roughly calculated or approximated using density curves or other mathematical means such as algorithms. The additional data of temperature and electrical conductivity allows for much more precise determination of weight, TDS, and density values. The additional sensors also provide redundancy in case one sensor goes offline, as the property of TDS can be efficiently and accurately calculated using known correlations between the missing data set.

In one embodiment a level sensor 12 can be used. Alternatively, a pressure sensor 13 could be used. Level sensors can include float sensors, radar sensors, ultrasonic sensors, infrared sensors, and other sensors known to persons skilled in the art. Temperature sensors 14 can include thermocouples, thermistor sensors, infrared type sensors and other temperature sensors known to persons skilled in the art.

Figure 7:
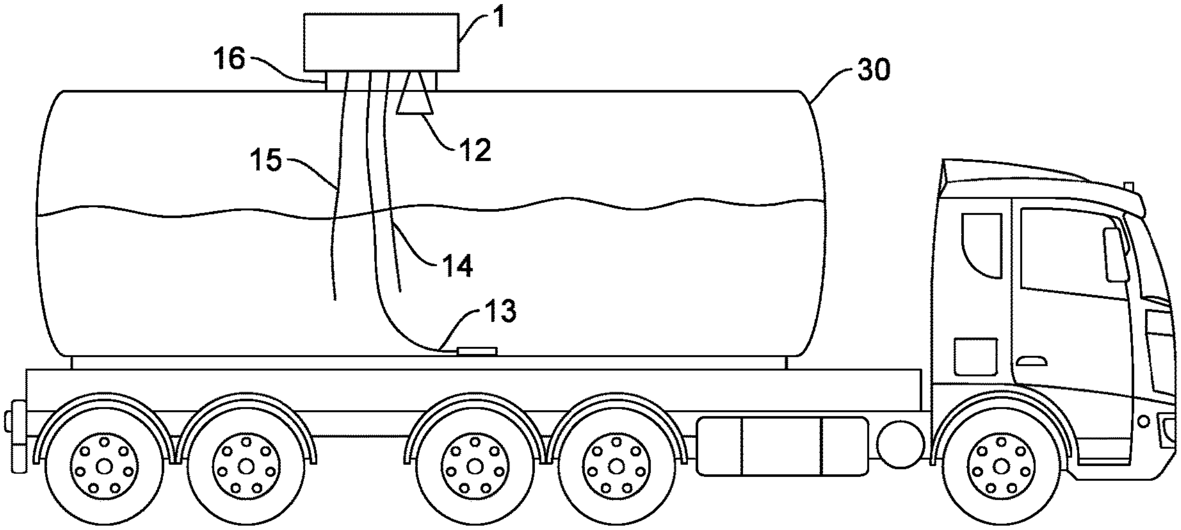
FIG. 7 illustrates an embodiment on how the tank monitoring device can be mounted on a manhole cover of a tank truck.

FIG. 7 is an embodiment illustrating how the tank monitoring device can be mounted on a manhole cover of a tank truck. In this embodiment, as shown in FIG. 7, the fluid monitoring device and system can be attached to at least one of the manholes covers 16 on top of and outside the tank truck 30. These manhole covers provides safe access to the inside of the tank, allowing tubing and instruments to pass inside. In this example, one of the two 2.5-inch portals typically adjacent to the manhole covers, that may be unused or partially used, could give the device wire access to the inside of the tank. The level sensor 12, pressure sensor 13, temperature sensor 14, and electrical conductivity gauge 15 will have access to the inside of the tank via the 2.5-inch portal. After running the wires, the access ports with the wires should be sealed or weatherproofed. The advantages of mounting the box to the manhole cover instead of the inside of the tank, include easier access and less obstructed telemetry for signal coverage.

In an additional embodiment, the fluid monitoring device can be connected to the vehicle's computer or on-board-diagnostic device. An on-board diagnostic (OBD) is a term referring to a vehicle's self-diagnostic and reporting capability. The OBD systems can provide the vehicle user, owner, or repair technician access to the status of the various vehicle sub-systems. Modern OBD implementations utilize a standardized digital communications port to provide real-time data in addition to a standardized series of diagnostic trouble codes, or DTCs, which allow a person to rapidly identify and remedy malfunctions within the vehicle. These DTCs can then be sent to the user owner, or to a vehicle dispatcher remotely and not just displayed to the driver. In one embodiment, the monitoring device can consist of a location tracker and a connection to the OBD system. In this embodiment, the monitoring device monitors the location of the vehicle or equipment and to monitor maintenance issues remotely. In this embodiment, a dispatcher can monitor the location of all the vehicles in the field as well as any maintenance issues.

Most vehicles utilize OBD-II systems. The OBD-II specification provides for a standardized hardware interface. The standardized hardware interface is a female 16-pin (2×8) J1962 connector, where type A is used for 12 Volt vehicles and type B for 24 Volt vehicles. Unlike the OBD-I connector, which was sometimes found under the hood of the vehicle, the OBD-II connector is required to be within 2 feet (0.61 m) of the steering wheel or under a manufacturer exemption, the OBD-II connector can be located anywhere within reach of the driver.

The OBD-II can be connected directly to the fluid monitoring device by wired connection to the female 16-pin (2×8) J1962 connector. Alternatively, a Bluetooth or Wi-Fi transmitter can be connected to the female 16-pin (2×8) J1962 connector and send the data wirelessly to the fluid monitoring device. The OBD data can then be sent to the user remotely via cellular communication or other communication such as satellite or microwave communication in remote areas.

Some vehicles have on-board computers that allow for connection devices to communicate with the on-board computer. In this embodiment, the monitoring device can be connected directly to the on-board computer of the vehicle.

Figure 4:
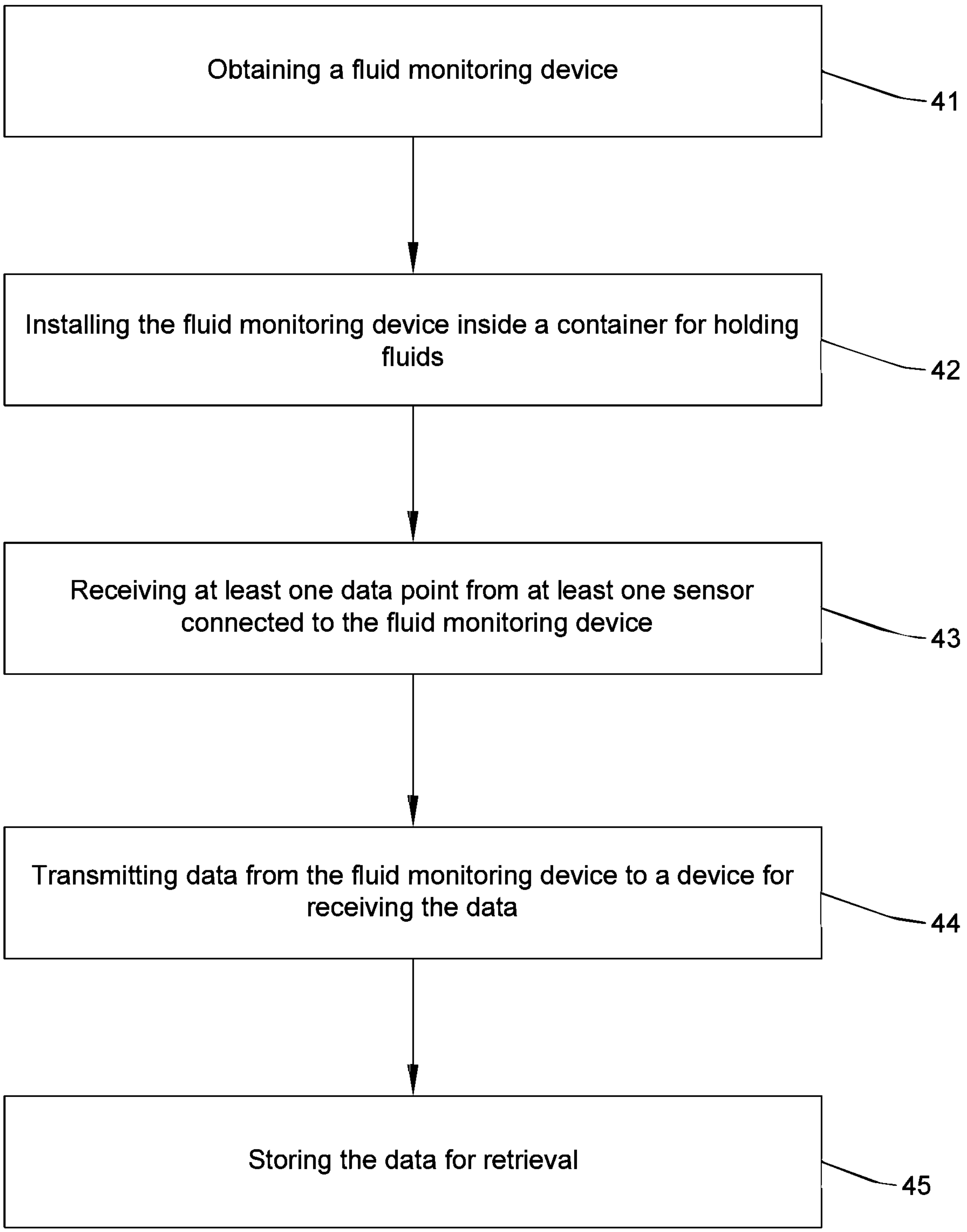
FIG. 4 illustrates a method embodiment.

FIG. 4 illustrates a method embodiment. As shown in FIG. 4, one method embodiment comprises 5 steps. First, a fluid monitoring device is obtained 41. Second, the fluid monitoring device is installed inside the container for holding fluids 42. Third, data is transmitted from the fluid monitoring device to a device for receiving the data 43. Fourth the data is stored for retrieval 44. Fifth, the data is displayed 45. Additional method steps that are not shown include: communicating with a user via text or email, determining additional properties, including, speed, number of breaks, duration of breaks, sending alerts for unexpected additions of withdrawals of fluid, sending alerts for preset water level limits of high and low, and combinations thereof. Additional method steps that are not shown include: communicating with a user via text, email, SCADA system, automated phone call, and combinations thereof.

Pipeline

Figure 5:
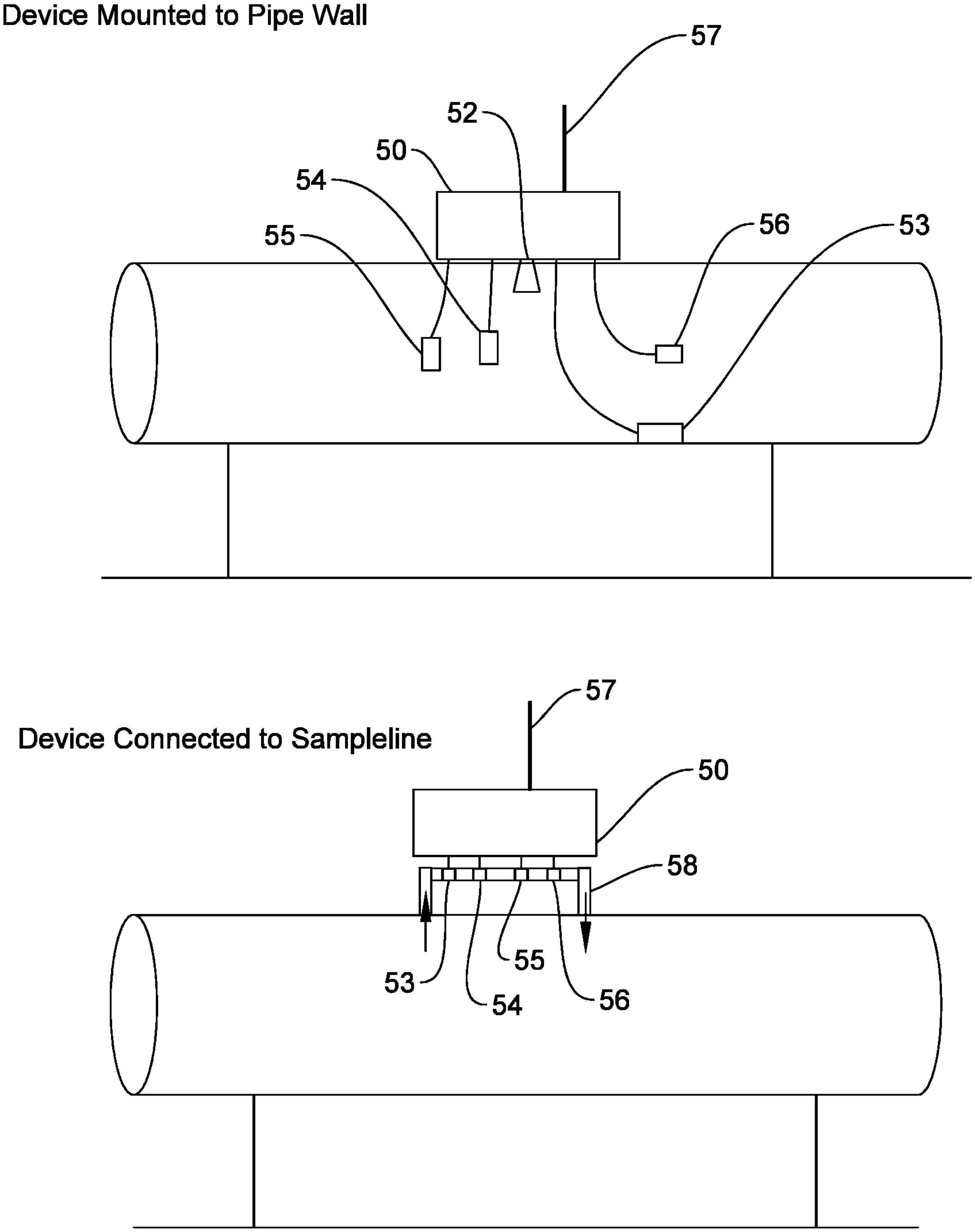
FIG. 5 illustrates an embodiment on how the fluid monitoring device can be mounted on the outer wall of a pipe to monitor fluid properties in a pipe with sensors on the exterior of the pipe.

FIG. 5 is an embodiment illustrating how the fluid monitoring device can be mounted on the outer wall of a pipe to monitor fluid properties in a pipe with sensors on the exterior of the pipe. In one embodiment, these fluid monitoring devices and systems can be slightly modified, as needed, and attached to a pipeline to determine fluid flow properties, as shown in FIG. 5. The sensors of the pipeline monitory device 50 can be inserted into the pipeline 51 to directly measure fluid level 52, pressure 53, temperature 5, electrical conductivity 55, and flow speed 56, to determine the fluid flow amounts and properties in the pipeline 50 and communicate the values via wireless transmission antennae 57 or wired connection (not shown) to the user. A second embodiment illustrating the fluid monitoring device making use of a sample line on the side of the pipe is shown in FIG. 5. Pipelines commonly have a set of fittings close together on the side of the pipe for connecting instruments or "samplelines" on the pipelines. Sensors for fluid pressure 53, temperature 54, electrical conductivity 55, and flow speed 56 are placed in the sampleline 58 to measure the properties of the sample water or fluid flowing through the sampleline.

In an alternate embodiment, the system can be utilized as a water quality monitoring system, to focus on monitoring water properties in the pipe. In this system, a temperature sensor 54, electrical conductivity or TDS sensor 55 would be used. TOG, ORP, salinity, or turbidity sensors could also be included. Sensors not related to water quality would not be used and thereby would not require maintenance.

Figure 6:
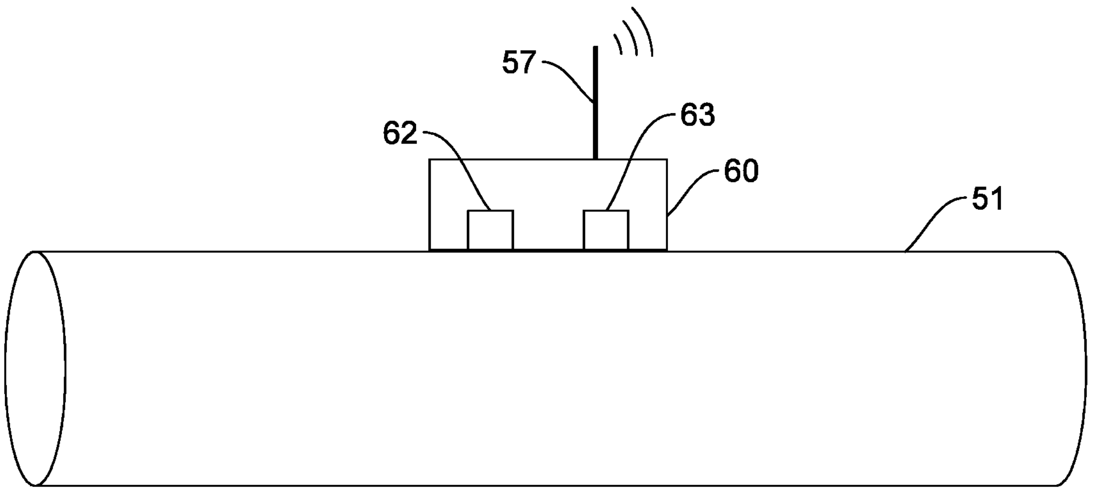
FIG. 6 illustrates an embodiment on how the fluid monitoring device can operate through the wall of a pipe with sensors inside the pipe to monitor fluid properties inside the pipeline.

In an alternative embodiment, the system can utilize infrared cameras and ultrasonic sensors outside of the pipeline to see inside the pipeline and determine fluid flow level and velocity. FIG. 6 illustrates an embodiment of how the fluid monitoring device can operate through the wall of a pipe with sensors inside the pipe to monitor fluid properties inside the pipeline. As shown in FIG. 6, in this embodiment, the remote pipeline monitoring device 60 can be attached directly to the pipeline 51, as shown or a distance away from the pipeline. Ultrasonic sensors 62 and infrared sensors 63 or cameras can monitor the fluid level, flow velocity, and make calibration estimations on the density and other properties based on the ultrasonic and infrared signal signatures, as known to persons skilled in the art. A similar device can be utilized to monitor water ponds, mud pits, frac tanks, and other fluid storage devices found at oil and gas sites remotely.

The ability to simultaneously track the fluid properties in the fluid storage tanks and ponds, pipelines and trucks would enable an industrial user to instantaneously and in real time monitor the entire fluid logistics of a well site or a work site or multiple sites for company or group of companies, as needed. Accordingly, this system can replace expensive SCADA systems and even become the backbone of an IOT system designed to replace the SCADA system.

System

The tank monitoring device can be utilized independently or combined with other systems including SCADA systems. In one embodiment, the tank monitoring system is combined with a fluid purification system onsite attached to the tank. For example, an evaporation system can be utilized with the invention, as disclosed. The evaporation system uses temperature sensors on the evaporator in coordination with the gas supply or heat supply and fluid flow to control the water evaporation process in a coordinated manner using a control system. Suitable control systems are disclosed in U.S. Pat. No. 11,034,605, entitled "AN APPARATUS SYSTEM AND METHOD TO EXTRACT MINERALS AND METALS FROM WATER." U.S. Pat. No. 11,034,065 is hereby incorporated by reference in its entirety. In one embodiment, at least one sensor for determining salt concentration of the unevaporated brine; and a control system for controlling the fluid into the system based on the at least one sensor for determining the salt concentration of the unevaporated brine to control the density of the brine. Other sensors can include temperature sensors, fluid flow sensors, pressure sensors, water quality testing sensors, and combinations thereof.

In one embodiment, the control system can run the entire apparatus at a remote site including a hydrocarbon producing well site, geothermal site, or solar thermal site. As water resources become scarcer geothermal and solar thermal will be utilized to desalinate water and this system can make the process more efficient. The system can automatically communicate with a truck operator, driver, or dispatcher when a tank needs to be emptied or when a tank needs to be filled using preset limits, as described later. With the control system it is possible to conduct all the method steps completely remotely with an operator offsite or be operated by a computer using artificial intelligence and/or machine learning. A system using artificial intelligence and/or machine learning would improve calibration and overall operations over time and will become more efficient and cost effective than manual or human operated devices.

In one embodiment, the entire thermal desalination system and all the controls and hookups can be fit inside a trailer or shipping container. This system would enable quick deployment by a truck and can be quickly hooked up to a site with minimum construction or materials and can be quickly removed and deployed at another site. Therefore, having a remote monitoring device or IOT device would significantly reduce costs, and make the system easier to mobilize, install, operate, and uninstall, as needed.

Software

In one embodiment, a software package or series of codes can be developed to help systems interact with the hardware and display the data. Below are descriptions of software embodiments which are not meant to be comprehensive or limiting. Persons skilled in the art with the benefit of the disclosures herein can determine additional software functionalities which can be included in the claimed invention.

In one embodiment, AI and ML algorithms can be implemented within the device to improve the accuracy of fluid measurements and data transmission. The device can continuously learn from the collected data to enhance its ability to determine fluid volumes and other properties. Through pattern recognition and data analysis, the device can adapt and adjust its measurements based on various factors such as irregular tank shapes, corrosive chemicals, and other environmental conditions. This adaptive capability ensures more reliable and consistent monitoring results.

The system described herein can benefit from AI and ML technologies. By incorporating AI and ML algorithms into the control system, the system can optimize the coordination of water-related activities in a more efficient and coordinated manner. The system can analyze the collected data, such as fluid levels, truck movements, and water quality parameters, to identify patterns and trends. Based on this analysis, the system can make intelligent decisions and recommendations to improve water management practices, reduce CO2 emissions, and enhance overall system performance.

Moreover, the AI and ML capabilities within the system can enable predictive maintenance functionalities. By continuously monitoring the device and system performance, AI algorithms can predict potential issues or failures, allowing for proactive maintenance and minimizing downtime.

The method described herein can be enhanced by AI and ML techniques to improve the overall efficiency and accuracy of fluid monitoring and data retrieval. AI algorithms can be utilized to analyze historical data and identify correlations between various parameters. This analysis can provide insights into optimal fluid levels, water consumption patterns, and potential anomalies. By leveraging this information, the method can be optimized to minimize water wastage, maximize efficiency, and reduce costs.

Additionally, AI and ML techniques can be employed to automate data retrieval and analysis processes. The method can utilize AI algorithms to automatically generate reports, calculate billing information, and provide real-time alerts and notifications. This automation streamlines operations, reduces human error, and improves the overall efficiency of the method.

In conclusion, the integration of AI and ML technologies into the device, system, and method described herein enhances the accuracy, efficiency, and effectiveness of fluid monitoring and management. These advanced capabilities provide users with valuable insights, predictive maintenance functionalities, and optimization opportunities, leading to improved operational performance and cost savings.

Detection and Sensing of Water Properties by DAO

The device for monitoring fluids described herein can be effectively utilized by a Decentralized Autonomous Organization (DAO) to detect and sense various water properties, thereby enhancing its operational efficiency and decision-making capabilities. The DAO can leverage the device's capabilities to remotely monitor and collect data on fluid volumes, levels, weights, and other properties in real time. By integrating the device into its operations, the DAO can benefit from accurate and reliable information regarding the status and conditions of fluid storage and transportation systems.

Improvements to the System for Detecting Water Properties by DAO

By incorporating the device into its existing systems, a DAO can significantly improve its ability to detect and monitor water properties. The device's wireless communication capabilities enable seamless transmission of data from the monitoring devices to a central server, which can be accessed and analyzed by the DAO. This streamlined data collection process eliminates the need for manual measurements and reduces the potential for human error.

Furthermore, the device's compatibility with other sensors, such as those measuring electrical conductivity, temperature, pH, ORP, turbidity, and other water quality parameters, enhances the system's ability to comprehensively monitor water properties. The DAO can leverage this additional data to gain insights into water quality, identify potential issues or anomalies, and make informed decisions regarding water resource management.

In one embodiment, integrating the device into its operations allows a DAO to improve the method of monitoring fluids. The remote monitoring capabilities of the device enable the DAO to efficiently obtain the data from more than one or multiple fluid monitoring devices that are installed in tanks or containers for holding fluids across multiple sites. This can eliminate the need for the physical presence of operators and minimizes operational costs associated with manual monitoring.

The real-time transmission of data from the fluid monitoring devices to a centralized server facilitates efficient data storage, retrieval, and display. The DAO can access and analyze the stored data to gain valuable insights into fluid levels, weights, and other properties. Additionally, the DAO can set user-defined alerts based on specific data thresholds, ensuring timely notifications and proactive decision-making.

By leveraging the device and its associated software functionalities, a DAO can optimize the utilization of resources, reduce downtime, and enhance overall operational efficiency. The ability to coordinate pipelines and fluid trucks based on the available water resources can prevent bottlenecks and ensure efficient water management. Furthermore, the device's ability to monitor water levels, weights, and quality parameters can assist in planning water-related activities, such as fracking or drilling jobs, by ensuring the availability of adequate water supply and appropriate water quality.

In one embodiment, the integration of the device for monitoring fluids into the operations of a DAO offers significant benefits in terms of detecting and sensing water properties. By leveraging the device's capabilities, a DAO can improve its system for monitoring water properties and enhance the overall efficiency of its operations.

System for Wastewater Management

In another embodiment of the invention, the device and system for monitoring fluids can be combined with artificial intelligence (AI), machine learning (ML), and decentralized autonomous organization (DAO) technologies to create a comprehensive wastewater management system. This system aims to efficiently manage the disposal and reuse of wastewater in an environmentally sustainable manner.

The monitoring device, as described previously, is installed in wastewater storage tanks and connected to the outer protective housing. The device is equipped with sensors to measure various properties of the wastewater, such as pH levels, turbidity, and chemical composition. These sensors continuously collect data and transmit it to a centralized control system.

The control system, powered by AI and ML algorithms, analyzes the data received from the monitoring devices. It uses the collected data to identify patterns, trends, and anomalies in the wastewater properties. By leveraging AI and ML technologies, the control system can make predictions and recommendations regarding the optimal disposal and reuse strategies for the wastewater.

Additionally, the control system can be integrated with a decentralized autonomous organization (DAO) framework. This framework allows for the creation of a network of stakeholders, including wastewater treatment facilities, industrial plants, and regulatory bodies. The DAO platform enables these stakeholders to collaborate and make collective decisions regarding wastewater management based on the insights provided by the control system.

Using AI, ML, and DAO technologies, the wastewater management system can optimize the allocation of wastewater resources. It can identify the most suitable disposal methods, such as treatment, recycling, or reuse, based on factors like wastewater quality, local regulations, and environmental impact. The system can also facilitate real-time communication and coordination between stakeholders, ensuring efficient and sustainable wastewater management practices.

The combination of the monitoring device, control system powered by AI and ML, and DAO framework can create a powerful wastewater management system. This system not only monitors and analyzes wastewater properties but also facilitates collaborative decision-making among stakeholders. By leveraging advanced technologies, the system aims to minimize environmental impact, maximize resource utilization, and promote sustainable wastewater management practices.

In one embodiment the device provides cloud and user interface communication. In this embodiment, the embedded software within the fluid monitoring device initiates data collection from various sensors. These data, such as fluid levels, pressure, and temperature, are then digitally processed and encrypted, ensuring secure transmission to the cloud through a wireless communication device like a cellular router. The cloud storage solution receives and stores data efficiently, with robust security measures in place.

In another embodiment, the device provides cloud-to-user dashboard or SCADA system functionality. In this embodiment, the software interfaces with the user dashboard or SCADA system, retrieving data from the cloud and converting it into a displayable format. The user dashboard offers customization and interactive features, whereas integration with the SCADA system ensures real-time control and monitoring in industrial settings.

Various embodiments provide different functionalities of the software. Depending on the needs of the user or industrial company, the software would provide one or more functionalities to meet those needs. The functionalities include but are not limited to data collection and processing including digitizing information from the sensors, encryption and security for ensuring data protection, communication protocols for enabling connectivity between the device, cloud, and user interface or SCADA system, real-time monitoring for providing continuous updates, data analysis and visualization providing tools for insights and visual representation, alert and notification system for enabling customizable alert, integration with existing systems allowing compatibility with existing platforms, user customization for enhancing usability and relevance.

A preferred embodiment, the software connects the physical sensors and digital interfaces in real-time or near real-time. The software and hardware combined provide a secure, efficient, and user-friendly solution for data collection, transmission, visualization, and control of both the water monitoring system and the water infrastructure system or systems. In one embodiment, the software application will have maps showing all the locations of water or fluid-carrying trucks or stationary fluid or water storage systems. Typically, the location would be a tank or trailer for any customer but can include any water-holding device or transportation device including trucks and pipelines. On the maps can be charts and/or numbers showing the current, cumulative, or historical fluid levels, weights, and density for tanks. For trucks, the charts and numbers can show current speed, average speed, time since last break, total time of last break, total time driving for the day, total miles traveled for the day, number of pickups, number of trips, and other useful information. For water quality, the numbers can show temperature, pH, salinity—usually expressed in total dissolved solids (TDS), ORP, turbidity, electrical conductivity, and other properties as measured by additional sensors, as described below.

In one embodiment, there will also need to be a graphical representation by clicking on the truck showing how full the tank is or how full the truck is and the weight of the truck and the location of the truck or tank. The map also has the capability to show breadcrumb historical locations as well as historical data such as average speed in miles or kilometers per hours (MPH or KMH) or highest speed for any given time in a data chart or graph view. Embodiments of the software can also graphically display total miles traveled, time traveled, number of breaks, time since last break, number of pickups, unloads, or routes completed. The data can be provided in a spreadsheet to allow easy internal or external compliance reporting, as discussed below.

The field data is typically sent via a cell phone using a cell phone router with a sim card. The data may contain GPS location, pressure reading, water height level reading which is currently being sent as IOT data that can be picked up on the website the cell router company provides. In areas with poor cellular coverage, microwave or satellite systems telemetry systems can be utilized to transmit and receive the data. The field data can also be sent via wired or network including fiber optics, if available.

The data can be sent via the cloud using providers AWS, Microsoft Azul, Google, Citrix cloud, IBM cloud, and combinations thereof. Alternatively, the data can be sent to a customer specific server or group of servers or computers to avoid the cloud, depending on the needs of the customer.

The software will typically have a login page wherein customers will have access to data from a single or multiple sim card by providing access codes to the data only for the sim cards associated with the customer. To simplify or hasten installation and calibration, the software can provide a database of truck tank storage sizes and geometries and the ability to show the level graphically. The database should include the most common types of water or fluid trucks plus the ability to input the geometries manually. A database can also be created to have known stationary tank sizes and geometries as well as pipeline diameters.

In one embodiment, the software provides monitoring alerts. The monitoring alerts can include the ability to send an alert when the tank is close to being full or depleted or a data showing when the tank will be full or depleted if the tank continues to be filled or drained at the current rate or future expected rate using machine learning. Additional functionality includes but is not limited to the ability to send alerts if the truck is too heavy, send alerts if the tank or tanks hits certain levels such as high low indicators, send alerts for abnormal fluid level increases or decreases, send alerts if the tank is within a certain time of being filled and drained based on fluid change rate, send alerts if the system stops communicating, and combinations thereof.

Users can set the alerts to include email, text message, automated phone calls, alarm signals and combinations thereof. Additional functionalities include but are not limited to: send alerts when there is a rapid or sudden change in the water level, send alerts when the truck is not moving for a predetermined amount of time or send alerts if the truck is too heavy or does not stop for breaks as scheduled, algorithm that determines the approximate speed of the truck and maximum speed of the truck at any giving time from the location and time stamps, algorithm that determines the total distance traveled by the truck during any given time or round trip run or time truck took to travel each run, the ability to determine and track how many breaks the truck driver took and the length of time for each break and hours since the last break, and combinations thereof.

In one embodiment, an algorithm that determines the approximate TDS of the water using the volume and weight and temperature can be provided in the software package. More detailed, more accurate, or more comprehensive water quality properties can be determined using additional sensors including but not limited to pressure sensors, water level sensors, electronical conductivity sensors, ORP sensors, turbidity sensors, pH sensors and combinations thereof.

A Decentralized Autonomous Organization (DAO) is typically based on smart contracts. In one embodiment, these are self-executing contracts where the terms are directly written into code. They automatically execute actions when predefined conditions are met, without the need for intermediaries.

Decentralized governance can be a crucial aspect of DAOs. The decision-making within a DAO is typically done through a consensus mechanism where members vote on proposals. Members, often token holders, can propose changes and vote on them. All rules, transactions, and token allocations are recorded on the blockchain, ensuring full transparency.

In one embodiment "Tokenomics" plays an essential role in DAOs. Tokens can represent ownership, voting rights, or access to certain functionalities. They also serve as incentives to encourage participation in the DAO's governance and growth.

Operational autonomy is a defining feature of DAOs. Once a decision is made by members' voting, the DAO's code automatically implements it. The organization operates without a central leadership or traditional management structure, and the rules that govern the DAO are tamper-proof unless a predefined majority of members vote to change them.

DAOs are designed to interact with other systems. They can interact with other smart contracts, DAOs, and decentralized applications (dApps) on the same blockchain. DAOs can also be integrated with technologies like IoT (Internet of Things) and AI (Artificial Intelligence) to create more complex autonomous systems.

Legal and regulatory compliance can be vital embodiments for DAOs. The regulatory status of DAOs is evolving, and it varies by jurisdiction. Compliance with local laws is crucial, and some DAOs may choose to have a legal entity to interface with traditional legal systems.

Security and risks are important considerations in the functioning of DAOs. The code should be robust to prevent security vulnerabilities, as any flaw can be exploited. Mechanisms for resolving disputes should be established, especially since a DAO's operations are primarily code driven.

There are several potential use cases for DAOs. They can be used for decentralized venture capital, where members collectively decide on investments. DAOs can also serve as governing bodies for community projects or digital assets, and their integration with IoT devices can enable transparent and decentralized supply chain management. These DAOs can be applied to companies and industries that need to manage water. For example, oil operators and oil companies can be partnered with service companies and water midstream companies to better manage infrastructure assets, freshwater, brackish water, impaired water, and wastewater. In different embodiments, tokens can be issued for freshwater, wastewater, or water recycled to each user depending on the goals or objectives of the DAO or project. Tokens can be issued for reducing carbon footprint or reducing water footprint for an individual user's operations or for the community.

DAOs can transform the way organizations are structured and operated. They replace centralized control with complete transparency, collective decision-making, and automation. This technology has the potential to create more democratic, efficient, and resilient organizations but also comes with its unique set of challenges and risks. The integration of DAOs into different industries, along with a clear regulatory framework, can be a key component to providing the best management of resources involving small companies, large companies, industries, government, and combinations thereof. Resources can be water, carbon reduction or sequestration, efficient utilization of infrastructure, and any combinations thereof.

The integration of Artificial Intelligence (AI), Machine Learning (ML), and Decentralized Autonomous Organization (DAO) provides embodiments that enable additional features for fluid monitoring, fluid recycling, and fluid reuse. AI and ML Algorithms can enable continuous learning and adaptation, pattern recognition and decision-making, optimization and efficiency, and combinations thereof.

AI and ML algorithms are employed to continuously learn from collected data. This enhances the ability to determine fluid volumes and other properties, allowing the system to adapt and adjust its measurements. Pattern recognition and decision-making enable the system to analyze data on various factors like fluid levels, truck movements, and water quality, identifying patterns, and making intelligent decisions. This improves water management practices, reduces CO2 emissions, and enhances overall performance. Optimization and efficiency objectives can use AI and ML techniques to provide insights into optimal fluid levels, water consumption patterns, and potential anomalies, optimizing water wastage, maximizing efficiency, and reducing costs.

platforms enable more efficient use of resources, and less downtime for not having enough water or enough disposal capacity.

In one embodiment, remote monitoring and collaboration are performed through DAO integration. DAO integration enables remote monitoring and data collection, enhancing operational efficiency and decision-making capabilities. It facilitates collaboration and collective decision-making among stakeholders, efficiently managing wastewater and other resources. The combined power of AI, ML, and DAO adds a sophisticated layer to the overall system, employing advanced techniques for analytics, optimization, remote monitoring, and collaboration. Whether utilized in industrial or specific applications. This integration provides a versatile tool for fluid management, monitoring, purification, and recycling.

In an additional embodiment machine learning and/or artificial intelligence or predictive learning can be utilized with the software package. Machine learning and predictive tools can be utilized to improve accuracy of data and algorithms and improve water management for a customer more efficient water truck miles and thus less CO2 emissions.

The machine learning or artificial intelligence component can then be utilized to figure out ways to better manage the water by using less water through recycling efforts or moving water less by diesel trucks to reduce the carbon footprint. Recycling efforts can include reusing water including produced water for drilling, fracking, other completion activities, workovers, and water flooding activities including enhanced oil recovery.

The machine learning or artificial intelligence component can be utilized to predict the maintenance requirements of the sensors, IOT hardware, and other electronic components. As the PH, TDS, electric conductivity and ORP sensors are exposed to substances in the water, a loss of accuracy will take place in a predictable manner. The machine learning/artificial intelligence functions can recognize such changes, predict maintenance needs, and send an alert to maintenance personnel. Electronic components which become intermittent, or fail can be recognized by the software.

The software package can be a proprietary package downloaded onto a customer computer, a web-based application, a mobile based application for IOS or Android phones or other smart phones, or combinations thereof. The mobile app can be the same as the web-based app or just a simple graphical representation of the water data level for onsite personal to enable the pumper or field engineer to determine water levels, amounts, and weight without visual site checks or manual measurements.

The software will then be able to generate user reports including logistical reports including 3PL reports. Data in the logistical reports can include volumes of water, distance traveled, the time required, volumes lost or unaccounted for, costs, and CO2 emitted in moving the water by truck or pipeline. The software can then be used to automatically generate billing for customers based on the number of truck pickups, water volumes, mileage, and time. In one embodiment blockchain can be used to segregate and secure the data by customer or other metrics. The software can be used for customer relations by sending customer updates or milestone numbers.

If multiple sites are covered by monitoring devices, the operator or the software can coordinate the pipelines and fluid trucks to utilize the available water including moving water more efficiently away from potential bottlenecks such as disposal sites that have reached or are near reaching pressure or volume limits. For example, if a pipeline is full, a water truck can be sent to pick up water at the well site to avoid the tanks from becoming full and potential shutting in a wellsite. Potential bottlenecks can be avoided by pumping the water through different sections of the pipeline. For fracking jobs and drilling jobs, the amount of water needed, along with TDS quality can be met by setting aside a certain amount matching the right TDS or salinity profile of the water.

The water can be set aside at tanks or ponds near the site and any water shortfall can be determined. This will enable more efficient planning of how many water trucks are needed to deliver additional water or remove the flow-back water after the fracking job or other completion jobs are finished. Overall, the combination of the hardware and software platforms enables more efficient use of resources and less downtime for not having enough water or enough disposal capacity.

Blockchain

Blockchain technology has a potential application in the field of water management. By providing a transparent and immutable ledger, blockchain ensures that the data concerning water usage, quality, and distribution are accurate and secure.

In the area of water distribution, blockchain can be used to track the flow of water through various channels and pipelines. By using smart contracts, automatic payments can be triggered when water is supplied to different areas. This ensures that the billing process is streamlined, and disputes related to payments can be minimized.

Water quality monitoring is another vital aspect that can benefit from blockchain. Sensors can be placed at various points in the water supply chain to monitor different parameters like pH, turbidity, and contaminants. This data can then be recorded on the blockchain, allowing all stakeholders to access accurate and real-time information. It enhances trust in the quality of water being supplied and facilitates timely actions if any issues are detected.

Water trading is a complex process that involves multiple stakeholders, including governments, private entities, and individuals. By utilizing blockchain, water rights, and trading can be managed more transparently and efficiently. Smart contracts can be implemented to automate the buying and selling of various types of water and water rights, reducing the administrative burden and potential for fraud or errors.

Blockchain also plays a crucial role in wastewater management. It enables the tracking of wastewater treatment, disposal, and recycling. By having all this information on a transparent platform, regulatory compliance can be more easily enforced, and the data can be used to improve treatment methods and strategies.

In addition, blockchain can foster community participation in water management. Decentralized platforms can allow local communities to have more control and say in how water resources are used and managed in their region. They can vote on various initiatives, track the implementation of community projects, and even contribute data through citizen science initiatives.

The integration of blockchain with Internet of Things (IoT) devices can further enhance water management. Sensors can send real-time data to the blockchain, and smart contracts can trigger immediate responses such as turning off water supply in case of a detected leak. This leads to more efficient use of water and reduces wastage.

Blockchain technology can revolutionize water management by providing transparency, security, efficiency, and community participation. Whether it's distribution, quality monitoring, trading, or wastewater management, blockchain offers a robust solution to many of the challenges faced in the water industry. Its integration with other technologies like IoT further extends its capabilities, making it a versatile tool for sustainable and effective water management.

The water monitoring device equipped with various sensors to measure fluid volumes, levels, and other properties described herein can be integrated with a blockchain network. This connection would allow the recorded data to be securely and transparently stored on the blockchain. Operators can access this immutable record to verify the authenticity of the data, which reduces the likelihood of disputes and increases trust among stakeholders.

Embodiments of the water monitoring device described earlier, when coupled with blockchain technology, provides a robust and flexible solution for operators and industries engaged in large-scale water management. From real-time tracking and automation to predictive insights, decentralized decision-making, and simplified compliance, blockchain enhances the functionality of the device, leading to improved efficiency, transparency, and collaboration.

In one embodiment, integrating blockchain can offer substantial benefits to operators and industries involved in large-scale water management. The water monitoring device equipped with various sensors to measure fluid volumes, levels, weights, and other properties can be integrated with a blockchain network. This connection would allow the recorded data to be securely and transparently stored on the blockchain. Operators can access this immutable record to verify the authenticity of the data, which reduces the likelihood of disputes and increases trust among stakeholders.

In industries where large amounts of water are being managed, like agriculture or manufacturing, blockchain's real-time tracking capability can be vital. By continuously monitoring and recording data on water usage, supply, and quality, industries can optimize their operations. Smart contracts on the blockchain can automatically execute actions based on specific conditions, such as ordering more water when levels reach a certain threshold or shutting down supply in case of contamination. This automation can lead to more efficient use of resources and cost savings.

The device's compatibility with artificial intelligence (AI) and machine learning (ML) algorithms can also be enhanced through blockchain. By storing the collected data on a transparent and accessible platform, machine learning models can be trained more effectively, allowing for predictive maintenance and anomaly detection. Industries can use these insights to anticipate issues before they become problematic, thus minimizing downtime and potential damage.

Blockchain's decentralized nature aligns well with the water monitoring device's ability to be used by a Decentralized Autonomous Organization (DAO). This structure ensures that decisions regarding water management can be made collaboratively by various stakeholders, including operators, regulatory bodies, and local communities. Through smart contracts and voting mechanisms on the blockchain, a more democratic and transparent decision-making process can be established.

Additionally, blockchain can assist in regulatory compliance. The immutable record of water quality, distribution, and usage ensures that all necessary information is readily available for audits and inspections. It simplifies the compliance process for operators and provides regulators with a reliable source of information.

Finally, the integration of blockchain with the water monitoring device encourages innovation and collaboration across different sectors. By providing a secure and transparent platform, new business models and partnerships can be explored. Industries can work together to develop sustainable water management practices, share resources, and collectively address challenges.

The specific water monitoring device described herein, when coupled with blockchain technology, provides a robust and flexible solution for operators and industries engaged in large-scale water management. From real-time tracking and automation to predictive insights, decentralized decision-making, and simplified compliance, blockchain enhances the functionality of the device, leading to improved efficiency, transparency, and collaboration.

Software Example

We have developed a dashboard system reporting almost real-time status from various Internet of Things (IoT) sensors. IoT represents small, always-connected devices like home cameras, thermostats, and more. In this, the software solves the problem of managing multiple devices with diverse user interfaces by collecting and formatting the data into a user-accessible dashboard. In one embodiment, the system described above receives status directly from devices in the field and presents it to the customer without adding or updating any data. Dashboards often contain sensitive and confidential information. Requiring users to log in helps ensure that only authorized individuals can access the data. This embodiment can be important when dealing with financial, personal, or proprietary information.

As per the application architecture, in this embodiment, the application comprises four separate parts, each with distinct tasks and communication through standard protocols. The architecture also includes the use of Arduino as a modern development platform. It is crafted to be fast, reliable, and easy to maintain, following up-to-date best practices. The architecture provides for data serialization to the cloud, ensuring protection from shutdowns.

In one embodiment, the architecture provides for data serialization to the cloud, ensuring protection from shutdowns. A series of API actions are available for different functions, like writing PH Data, TDS Data, Temperature Data, Level Data, and Pressure Data to the Cloud Service. Specific API keys and paths are defined for each function, with appropriate return codes. The system continues to integrate with the previously described device-to-cloud and user interface communication. This includes data collection and processing, encryption and security, real-time monitoring, data analysis and visualization, alerts and notifications, and integration with existing systems.

Functional requirements include the ability to receive status updates from Sensors and other IoT devices and store the updates to the cloud service platform for future use. Non-functional requirements include the following: data volume, channels, number of modules, Arduino software, and API actions.

A series of API actions are available for different functions, like writing pH data, TDS data, temperature data, water quality data including TOC and, flow data, level data, and Pressure Data to the Cloud Service. Specific API keys and paths are defined for each function, with appropriate return codes. The system continues to integrate with the previously described device-to-cloud and user interface communication. This includes data collection and processing, encryption and security, real-time monitoring, data analysis and visualization, alerts and notifications, and integration with existing systems.

By incorporating the essential components of the IOT application, the technology can provide a comprehensive hardware and software solution. The IoT devices can be efficiently managed and monitored through an intelligent, unified dashboard system. The architecture, functional and non-functional requirements, and specific API functionalities a perspective on the technology's capabilities.

Figure 8:
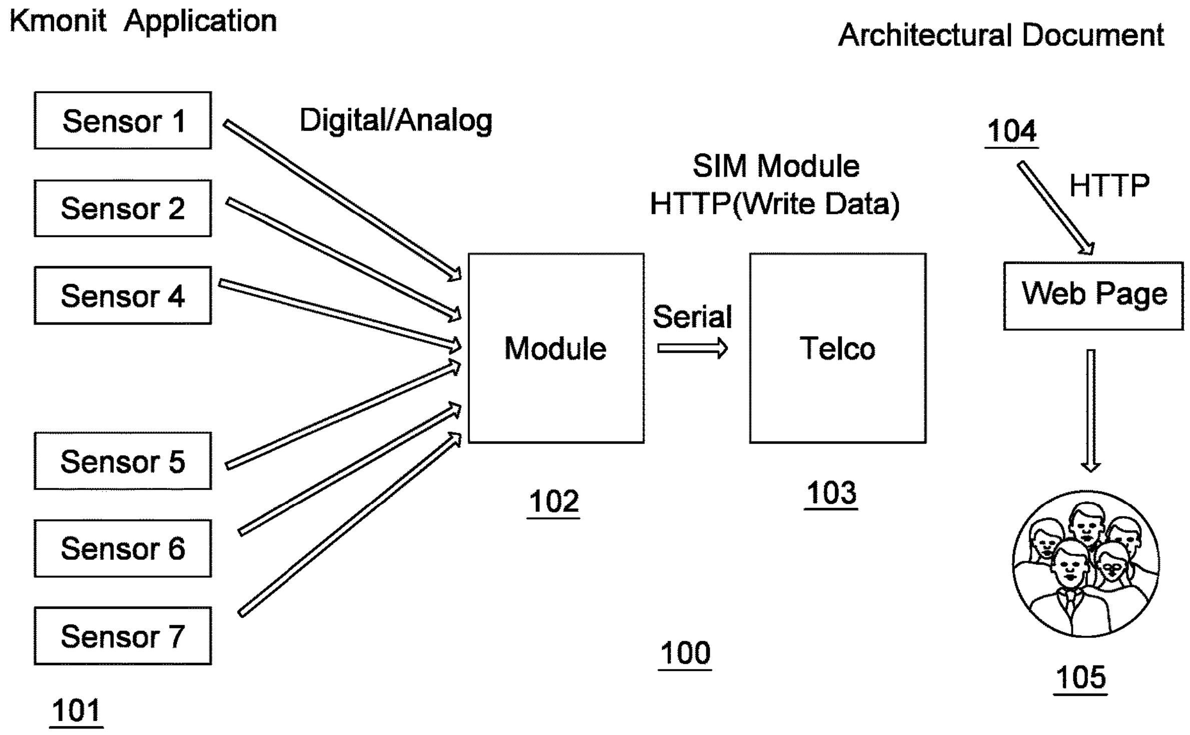
FIG. 8 illustrates an overview of the software architecture.

FIG. 8 is a high-level overview of the software architecture 100. As shown in FIG. 8, the application is comprised of four separate components; each component has its own tasks, and each component communicates with the other components or services using standard protocols. The four components or sections include sensors 101, device module 102, transmitter 103, and data storage or cloud 104. An optional fifth component is user interface 105 which can be a website 106 or SCADA system (not shown). One or more sensors 101 collect data. In this example, there are seven sensors, the sensors 10, can collect data from the group of properties consisting of temperature, flow rate, pressure, pH, Total Dissolved Solids (TDS), Electrical Conductivity (EC), density, oil content, oil and grease levels, Total Organic Carbon (TOC), Oxidation Reduction Potential (ORP), Turbidity, CO2 dissolved, CO2 effervescent H2S dissolved, H2S effervescent, methane dissolved, methane effervescent, other water properties, and any combinations thereof.

Device module 102 takes the data as either digital data or analog data. The data is then sent to transmitter 103. The transmitter transmits the data to the state storage device 104. The transmitter can be a modem, cellular router, Wi-Fi transmitter, Microware transmitter, or satellite transmitter depending on the location and options. The data storage 104 can be a computer, a private or public server, or a cloud provider such as AWS, Microsoft, and/or Google. The user interface 105 provides the software functionalities and user options described herein.

In one embodiment, the only place for data in the application is the data storage device, which serializes the data to the cloud, thus protecting it from cases of shutdown. The software typically converts 4-10 mA, IP data, or MODBUS data to a digital value that can then be transmitted and used by the control systems or user interface.

This architecture, in conjunction with the modern development platform Arduino will help create a modern, robust, easy-to-maintain, and reliable system, which can serve the company successfully for years to come, and helps it achieve its financial goals. Future plans include creating a single board to handle all the tasks of module 102 and transmitter 103 and would combine two components into one component.

This example illustrates how IoT devices can be efficiently managed and monitored through an intelligent, unified dashboard system. Various embodiments utilize the architecture, functional and non-functional requirements, and specific API functionalities to provide an all-encompassing perspective on the technology's capabilities.

Hypothetical System Example

In one example of an embodiment, a waterproof or splashproof electronic enclosure is attached to the inside top of the water tank. The enclosure can be attached directly to the top of the water tank or can be attached using a mount on the top of the tank. There will be two sensors attached to the enclosure. One sensor will be on the enclosure facing the water level to measure the tank level. The second sensor will be a small cord to the bottom of the tank to measure pressure and calculate the weight. The enclosure is approximately 3 inches by 8 inches. To improve accuracy the user can calibrate the measured water level with the level monitoring sensor.

A second waterproof or splashproof electronic enclosure on the inside top of the truck. The enclosure can be attached directly to the top of the water tank or can be attached using a mount on the top of the tank. There will be two sensors attached to the enclosure. One sensor will be on the enclosure facing the water level to measure the tank level. The second sensor will be a small cord to the bottom of the tank to measure pressure and calculate the weight using calibration, curve matching, machine learning and combinations thereof. The enclosure is approximately 3 inches by 8 inches and therefore under one square foot or one cubic foot in area or volume respectively. To improve accuracy the user can correlate the pressure sensor with weight and the level sensor with measured fill volumes. Alternatively, the size and geometry of the container can be used to either calibrate the data directly with the level monitor or in combination with other measurements.

The data is sent from the truck and the water tank through a wireless network and is picked up by a server. Typically, the server is on the cloud. In one embodiment, the server receives three data points. The three data points are GPS location, water level, and weight. Additional sensors can include electrical conductivity, temperature, PH, ORP, turbidity and other known water quality sensors. From the data, additional properties can be determined regarding water quality and other properties. From plotting the GPS location, or mathematical calculation, the server can determine current speed, historical speed during any chosen time interval, average speed, number of breaks, time of each break, time since last break and distance travelled or time to travel a designated route. This data can be graphically displayed on a map to help the user understand and process the data. Additional data that can be determined from the tank level monitor and weight monitor include density, salt concentration of total dissolved Solids (TDS) concentration. This data can then later be used for regulatory compliance, internal reporting, or for liability defense if there is a spill or accident.

To avoid having expensive onsite workers monitor the water organization, the system can be set to automatically call a water truck when a tank is close to becoming full and make sure a water truck arrives before the maximum level of the tank is reached. This system can improve water trucking efficiency, reduce miles traveled, and prevent oil and gas wells from being shut in because there is no additional water storage space.

Additional functionalities include the ability for the user to set user defined alerts. These user defined alerts can be sent via text, email, or automated calls. The control system comprises means for setting an alert value and sending an alert when the data reach the user alert value and wherein the alert values are selected from the group consisting of weight of fluid, fluid levels, rate of fluid additions, rate of fluid withdrawal, unexpected volume additions of withdrawals of fluid, time truck is moving, time truck is not moving, and combinations thereof.

This system can be combined with other data collection systems including SCADA system at industrial sites and on-board truck and vehicle computers and third party at telemetry devices, including telemetry devices sold by the original equipment manufacturers. For example, the SCADA data collection systems at large well sites and vehicle data telemetry systems on newer trucks can be combined with the remote monitoring equipment placed at smaller well sites and older trucks to provide a complete organization or logistics picture that was not available before.

Embodiments of this invention are intended to include any fluid monitoring system. While most fluids are water based, additional fluids can include heating oil, crude oil, diesel, gasoline, industrial fluids, and combinations thereof. All fluid types are intended to be included in the claimed invention.

What is claimed is:

1. An apparatus comprising:

an outer protective housing;

a wireless communication device inside the outer protective housing;

at least one device for determining at least one property of a fluid that is connected to the outer protective housing, wherein the at least one property of the fluid comprises at least one of pressure, pH, or temperature and wherein the at least one device for determining at least one property of a fluid is configured to be in fluid communication with the fluid; and at least one transmitter, operatively coupled to the at least one device for determining at least one property of a fluid, for sending data from the at least one device for determining the at least one property of the fluid to the wireless communication device.

2. The apparatus of claim 1, wherein a cable connects the at least one device for determining the at least one property of the fluid to the at least one transmitter.

3. The apparatus of claim 1, further comprising a receiving device for receiving the information sent via the wireless communication device, a graphical display for displaying the data sent via the wireless communication device, and a storage device for storing the data sent via the wireless communication device, wherein the data is sent through the internet.

4. The apparatus of claim 1, further comprising a battery inside the outer protective housing.

5. The apparatus of claim 4, further comprising a device for determining a location, wherein the device for determining a location is disposed within the outer protective housing and is operatively coupled to at least one of the wireless communication device or the at least one transmitter such that location data is communicated with the data from the at least one device for determining the at least one property of the fluid.

6. The apparatus of claim 1, wherein the wireless communication device is a cellular router and wherein the transmitter is configured to convert an analog signal from the at least one device for determining the at least one property of a fluid into a digital signal and provide the digital signal to the cellular router for transmission via the internet.

7. The apparatus of claim 6, further comprising a receiving device for receiving the information sent via the wireless communication device, a graphical display for displaying the data sent via the wireless communication device, and a storage device for storing the data sent via the wireless communication device, wherein the transmitter comprises an analog-to-digital converter.

8. The apparatus of claim 1, further comprising a control system configured to receive the data from the at least one device for determining the at least one property of the fluid and calculate at least one output based on the data.

9. The apparatus of claim 8, wherein the control system further comprises a controller configured to cause a graphical display to display the data on the internet to at least one user.

10. The apparatus of claim 8, wherein the system is on a water truck and the control system is configured to use the data transmitted through the internet to determine at least one additional property, wherein the additional properties are chosen from the group consisting of speed, number of breaks, duration of each break, weight of fluid, density, salt concentration in fluid, and combinations thereof.

11. The apparatus of claim 8, wherein the system is on a water truck and the control system is configured to receive or set an alert value and send an alert to at least one user when the data reach the alert value, wherein the alert values are selected from the group consisting of weight of fluid, fluid levels, rate of fluid additions, rate of fluid withdrawal, unexpected volume additions or withdrawals of fluid, time truck is moving, time truck is not moving, and combinations thereof.

12. The apparatus of claim 8, wherein the control system is configured to receive data from at least two tank fluid monitoring devices and cause a graphical display to display data corresponding to the at least two tank fluid monitoring devices.

13. The apparatus of claim 8, wherein the at least one device for determining at least one property of the fluid comprises a tank fluid monitoring device, and wherein the control system is configured to receive corresponding fluid-property data from a plurality of tank fluid monitoring devices using the internet.

14. A method comprising:

Obtaining a fluid monitoring device, wherein the fluid monitoring device comprises: an outer protective housing; a wireless communication device inside the outer protective housing; at least one device for determining at least one property of a fluid that is connected to the outer protective housing, wherein the at least one property of the fluid comprises at least one of pressure, pH, or temperature and wherein the at least one device for determining at least one property of a fluid is configured to be in fluid communication with the fluid; and at least one transmitter, operatively coupled to the at least one device for determining at least one property of a fluid, for sending data from the at least one device for determining the at least one property of a fluid to the wireless communication device;

Installing the fluid monitoring device inside a tank for holding fluids;

Transmitting data from the fluid monitoring device to a device for receiving the data; and Storing the data for retrieval.

15. The method of claim 14, further comprising graphically displaying the data on the internet.

16. The method of claim 15, further comprising communicating with a user.

17. The method of claim 16, further comprising setting an alert value by the user and sending an alert when the data reach the user alert value.

18. The method of claim 17, wherein the alert values are selected from the group consisting of weight of fluid, fluid levels, rate of fluid additions, rate of fluid withdrawal, unexpected volume additions of withdrawals of fluid, time truck is moving, time truck is not moving, and combinations thereof.

19. The method of claim 14, further comprising using the data to determine at least one additional property, wherein the additional properties are chosen from the group consisting of speed, number of breaks, duration of each break, weight of fluid, density, salt concentration in fluid, and combinations thereof.

20. An apparatus comprising:

an outer protective housing;

a cellular router inside the outer protective housing;

at least one device for determining at least one property of a liquid that is connected to the outer protective housing, wherein the at least one property of the liquid comprises at least one of pressure, pH, or temperature and wherein the at least one device for determining at least one property of the liquid is configured to be in fluid communication with the liquid; and at least one transmitter, operatively coupled to the at least one device for determining at least one property of the liquid, for sending data from the at least one device for determining the at least one property of the liquid to the cellular router.

* * * * *